US012349184B2

(12) United States Patent
Jiang et al.

(10) Patent No.: US 12,349,184 B2
(45) Date of Patent: Jul. 1, 2025

(54) SIDELINK CONGESTION CONTROL METHOD AND DEVICE

(71) Applicant: VIVO MOBILE COMMUNICATION CO., LTD., Guangdong (CN)

(72) Inventors: Wei Jiang, Guangdong (CN); Zichao Ji, Guangdong (CN); Shuyan Peng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 591 days.

(21) Appl. No.: 17/715,171

(22) Filed: Apr. 7, 2022

(65) Prior Publication Data

US 2022/0232583 A1     Jul. 21, 2022

Related U.S. Application Data

(63) Continuation of application No. PCT/CN2020/119226, filed on Sep. 30, 2020.

(30) Foreign Application Priority Data

Oct. 8, 2019   (CN) .......................... 201910951025.2

(51) Int. Cl.
*H04W 72/566*   (2023.01)
*H04W 28/02*   (2009.01)
(Continued)

(52) U.S. Cl.
CPC ..... *H04W 72/569* (2023.01); *H04W 28/0289* (2013.01); *H04W 72/1263* (2013.01); *H04W 72/54* (2023.01)

(58) Field of Classification Search
CPC ....... H04W 72/56; H04W 72/02; H04W 4/40; H04W 56/0015; H04W 72/0446;
(Continued)

(56) References Cited

U.S. PATENT DOCUMENTS 10,485,000 B2 * 11/2019 Shaheen ........... H04W 36/0022
11,109,363 B2 *  8/2021 Huang ................. H04L 1/1896
(Continued)

FOREIGN PATENT DOCUMENTS

CN      107040959 A      8/2017
CN      107371261 A      11/2017
(Continued)

OTHER PUBLICATIONS

Huawei, "QoS management for NR sidelink", 3GPP TSG RAN WG1 Meeting #96bis , R1-1903952, Xi'an, China, Apr. 8-12, 2019.
(Continued)

*Primary Examiner* — David Q Nguyen
(74) *Attorney, Agent, or Firm* — Price Heneveld LLP (57) ABSTRACT

Embodiments of this disclosure provide a sidelink congestion control method and a device. The method includes: determining a physical-layer priority mapping rule; and determining a physical-layer priority or physical-layer priority count value of a first terminal according to the physical-layer priority mapping rule; where the physical-layer priority or the physical-layer priority count value is used for determining a transmission resource for the first terminal.

14 Claims, 4 Drawing Sheets

(51) Int. Cl.
*H04W 72/1263* (2023.01)
*H04W 72/54* (2023.01)

(58) Field of Classification Search
CPC ... H04W 4/46; H04W 56/001; H04W 72/121; H04W 76/14; H04W 72/20; H04W 64/00; H04W 76/18; H04W 92/18; H04L 1/1854; H04L 1/1812
USPC .................................. 370/328, 329, 330, 331
See application file for complete search history.

(56) References Cited

U.S. PATENT DOCUMENTS

| | | | |
|---|---|---|---|
| 11,695,516 B2* | 7/2023 | Huang | H04L 1/1864 370/312 |
| 2018/0206260 A1 | 7/2018 | Khoryaev et al. | |
| 2019/0200370 A1 | 6/2019 | Yang et al. | |
| 2019/0268919 A1 | 8/2019 | Shi et al. | |
| 2020/0068593 A1 | 2/2020 | Seo | |
| 2022/0086803 A1* | 3/2022 | Li | H04W 72/0446 |
| 2022/0131803 A1* | 4/2022 | Ko | H04W 72/02 |
| 2022/0174647 A1* | 6/2022 | Lee | H04W 4/70 |
| 2022/0224443 A1* | 7/2022 | Lee | H04W 72/23 |
| 2023/0180301 A1* | 6/2023 | Seidel | H04W 74/006 370/329 |

FOREIGN PATENT DOCUMENTS

| | | |
|---|---|---|
| CN | 109891985 A | 6/2019 |
| CN | 109906647 A | 6/2019 |
| WO | 2018174630 A1 | 9/2018 |
| WO | 2019184787 A1 | 10/2019 |

OTHER PUBLICATIONS

Samsung, "Priority handling for UE autonomous resource selection", 3GPP TSG RAN WG1 Meeting #85, R1-164761, Nanjing, May 23-27, 2016.

* cited by examiner

SIDELINK CONGESTION CONTROL METHOD AND DEVICE

CROSS-REFERENCE TO RELATED APPLICATIONS

The present application is a bypass continuation application of International Application No. PCT/CN2020/119226 filed on Sep. 30, 2020, which claims priority to Chinese Patent Application No. 201910951025.2, filed in China on Oct. 8, 2019, which are incorporated herein by reference in their entireties.

TECHNICAL FIELD

Embodiments of this disclosure relate to the field of communications technologies, and specifically, to a sidelink (SL) congestion control method and a device.

BACKGROUND

With the development of mobile communications technologies, increasing technologies for improving communication efficiency are introduced. For example:
1. Sidelink A sidelink is used for direct data communication between terminal user equipments (UE) without intervention of a network device, and is applicable to specific public security transactions (such as emergency communication in disaster-stricken venues such as fireplaces or earthquakes), vehicle to everything (V2X) communication, or the like. Vehicle to everything communication includes various services, such as basic security communication, advanced (automatic) driving, formation, or sensor extension.

Sending UE sends control information (for example, sidelink control information) by using a physical sidelink control channel (PSCCH), and sends data by using a physical sidelink shared channel. After receiving the control information, receiving UE demodulates the control information and determines a transport block size, a modulation and coding scheme, allocated resources, and the like based on the demodulated control information. Based on such information, the receiving end receives data on corresponding time-frequency resources and performs demodulation.

Sidelink transmission is mainly in several transmission forms: broadcast, groupcast, and unicast.
2. Resource Selection Basic principles for UE autonomous resource selection are as follows:

Measurement is performed in a sensing window, and in each sensing transmission time interval (TTI), sidelink control information is demodulated and a reference signal received power (RSRP) is measured. The UE performs resource selection through the following steps:

(1) excluding subframe (subframe) resources for data transmission by the terminal;

(2) demodulating received sidelink control information by the terminal to obtain subframes of reserved resources of other terminals and obtain an RSRP measurement value between terminals;

(3) using resources not reserved by other terminals and resources that are reserved by other UEs but whose RSRP value between terminals is less than a defined sidelink reference signal received power (SL-RSRP) threshold as candidate resources; and (4) within a selection window, randomly selecting, from the candidate resources, one subframe for resource reservation.

In a specific period of time, if demands for a specific resource in a network exceed an available portion of the resource, performance of the network is deteriorated, resulting in congestion.

Currently, the protocol has no related description about a congestion control mechanism, and how to ensure high-reliability low-latency services in high load cases is a problem to be urgently resolved.

SUMMARY

Embodiments of this disclosure provide a sidelink congestion control method and a device.

According to a first aspect, some embodiments of this disclosure provide a sidelink congestion control method, applied to a first terminal and including:

determining a physical-layer priority mapping rule; and determining a physical-layer priority or physical-layer priority count value of the first terminal according to the physical-layer priority mapping rule; where the physical-layer priority or the physical-layer priority count value is used for determining a transmission resource for the first terminal.

According to a second aspect, some embodiments of this disclosure further provide a terminal, where the terminal is a first terminal and includes:

a first determining module, configured to determine a physical-layer priority mapping rule; and a second determining module, configured to determine a physical-layer priority or physical-layer priority count value of the first terminal according to the physical-layer priority mapping rule; where the physical-layer priority or the physical-layer priority count value is used for determining a transmission resource for the first terminal.

According to a third aspect, some embodiments of this disclosure further provide a terminal, including: a processor, a memory, and a program stored in the memory and capable of running on the processor. When the program is executed by the processor, the steps of the sidelink congestion control method according to the first aspect are implemented.

According to a fourth aspect, some embodiments of this disclosure further provide a computer-readable storage medium. The computer-readable storage medium stores a computer program, and when the computer program is executed by a processor, the steps of the sidelink congestion control method according to the first aspect are implemented.

BRIEF DESCRIPTION OF DRAWINGS

Other advantages and benefits will become apparent to those of ordinary skill in the art by reading detailed description of the exemplary embodiments below. The accompanying drawings are merely intended to illustrate the purposes of the preferred implementations, and should not be construed as a limitation on this disclosure. Throughout the accompanying drawings, the same reference numerals represent the same components. In the accompanying drawings.

DETAILED DESCRIPTION OF EMBODIMENTS

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In some embodiments of this disclosure, words such as "an example" or "for example" are used to represent an example, an instance, or an illustration. Any embodiment or design scheme described as "an example" or "for example" in some embodiments of this disclosure should not be construed as being more preferred or advantageous than other embodiments or design schemes. To be precise, the words such as "an example" or "for example" are intended to present a related concept in a specific manner.

Techniques described in this specification are not limited to a fifth generation (5G) system and a later evolved communications system, and also are not limited to an LTE/LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system can implement radio technologies such as CDMA2000 and universal terrestrial radio access (UTRA). The UTRA includes wideband CDMA (WCDMA) and other CDMA variants. The TDMA system can implement radio technologies such as the global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "Third Generation Partnership Project" (3rd Generation Partnership Project, 3GPP). The CDMA2000 and UMB are cited from descriptions of the documentation of the organization named "Third Generation Partnership Project 2" (3GPP2). Techniques described in this specification may be used in the aforementioned systems and radio technologies, and can also be used in other systems and radio technologies.

The terminal in this specification may be a mobile phone, a tablet computer, a notebook computer, an ultra-mobile personal computer (UMPC), a netbook, a personal digital assistant (PDA), a mobile Internet device (MID), a wearable device, an in-vehicle device, or the like.

Figure 1:
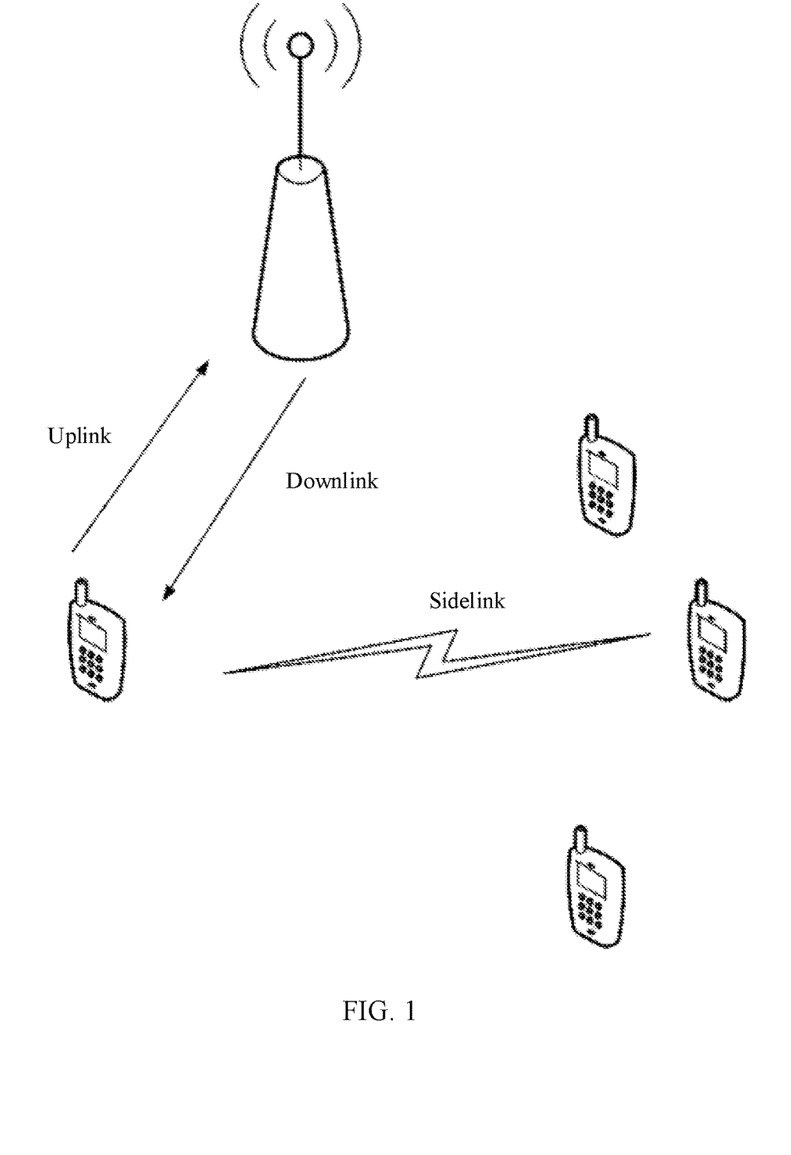
FIG. 1 is a schematic diagram of uplink, downlink, and sidelink in an LTE system.
Figure 2:
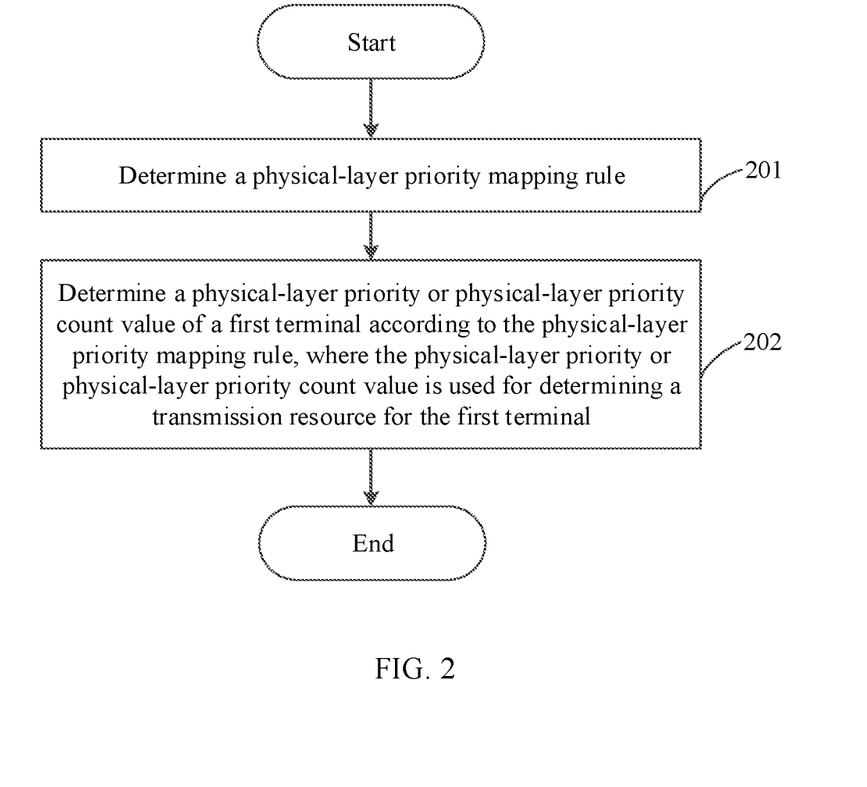
FIG. 2 is a flowchart of a sidelink congestion control method according to some embodiments of the disclosure.

Referring to FIG. 2, some embodiments of this disclosure provide a sidelink congestion control method, and an execution body of the method is a first terminal, for example, a sending end or a receiving end. The method includes step 201 and step 202.

Step 201: Determine a physical-layer priority mapping rule.

Step 202: Determine a physical-layer priority or physical-layer priority count value (counter) of the first terminal according to the physical-layer priority mapping rule.

The physical-layer priority or the physical-layer priority count value may be used for determining a transmission resource for the first terminal.

In some embodiments of this disclosure, the physical-layer priority or the physical-layer priority count value is further used for resource preemption by the first terminal, or used for determining a reference signal received power threshold by the first terminal.

Optionally, the physical-layer priority mapping rule may be protocol-predefined, or may be network-configured, or may be configured by a higher-layer application.

In some implementations, the physical-layer priority mapping rule may include a mapping relationship between higher-layer parameters of the first terminal and physical-layer priorities. The higher-layer parameter may be used to indicate a quality of service identifier (for example, a PC5 quality of service identifier (PC5 QoS Identifier, PQI)), a priority level, a quality of service (QoS) indicator, reliability, priority, delay, 5G QoS identifier (5QI), and so on. For example, a higher priority of QoS indicates higher reliability, a shorter delay requirement, and a higher physical-layer priority.

Optionally, the higher-layer parameter may include one or more of the following: (1) PQI of service; (2) resource type of service; (3) default priority level of service; (4) packet delay budget of service; (5) packet error rate of service; (6) default maximum data burst volume of service; and (7) default averaging window of service.

For example, the packet error rate of service may indicate reliability, the default priority level of service may indicate a priority level, the data delay of service may indicate a QoS indicator and delay, and the resource type of service, the default maximum data burst volume of service, and the default averaging window of service may indicate 5QI.

Further, the mapping relationship (for example, a mapping table) between higher-layer parameters of the first terminal and physical-layer priorities may be protocol-predefined, or may be network-configured, or may be configured by a higher-layer application.

In some implementations, the physical-layer priority mapping rule may include a mapping relationship between dynamic parameters (which may be also referred to as dynamic factors) related to the first terminal and physical-layer priorities. The dynamic parameters related to the first terminal may include one or more of the following: (1) 5G quality of service identifier (5QI) of service; (2) first time (which may be also referred to as remaining time), where the first time indicates duration between a current time point and a packet loss time point; (3) second time (which may be also referred to as past time), where the second time indicates duration between a time point of packet generation and a current time point; (4) proportion of the first time or the second time to a packet delay budget (PDB); (5) service information (such as traffic type or service periodicity) of service; (6) transmission type (such as broadcast, groupcast (option1/2), or unicast) of service; (7) transmission distance of service; (8) resource allocation node of service; (9) resource reservation node (for example, mode 1 (mode-1) base station, other control terminals, or sending end) of service; and (10) delay count of service (or referred to as the number of times being preempted).

Groupcast (option1): A receiving end (Receiver UE) transmits only a hybrid automatic repeat request negative acknowledgment (HARQ NACK). Groupcast (option2): A receiving end transmits only a hybrid automatic repeat request acknowledgment/negative acknowledgment (HARQ ACK/NACK).

In some implementations, the mapping relationship (for example, a mapping table) between dynamic parameters related to the first terminal and physical-layer priorities may be protocol-predefined, or may be configured by a network side, or may be configured by a higher-layer application.

For example, higher-layer priorities 1 and 2 are mapped to a physical-layer priority 1; and higher-layer priorities 3 and 4 are mapped to a physical-layer priority 2.

For another example, a larger value of 5QI corresponds to a higher physical-layer priority; or a shorter first time corresponds to a higher physical-layer priority; or a longer second time corresponds to a higher physical-layer priority; or a larger delay count corresponds to a higher physical-layer priority; or if a base station allocates a high-priority resource, a mode 2 terminal (mode-2 UE) cannot preempt the resource allocated by the base station; or a resource with a longer distance or exceeding a minimum required communication range (min required communication range) is preferentially preempted; or a physical-layer priority corresponding to broadcast is higher than a physical-layer priority corresponding to groupcast, and the physical-layer priority corresponding to groupcast is higher than a physical-layer priority corresponding to unicast.

In some implementations, the first terminal may obtain a physical-layer priority of a service of the first terminal through calculation based on the mapping relationship between dynamic parameters and physical-layer priorities in the following specific manners:

(1) Adding up physical-layer priorities corresponding to the dynamic parameters to obtain the physical-layer priority of the service of the first terminal.

For example, a dynamic parameter A corresponds to a physical-layer priority 1, a dynamic parameter B corresponds to a physical-layer priority 2, and a dynamic parameter C corresponds to a physical-layer priority 3. In this case, the physical-layer priority of the service of the first terminal is equal to 5 (1+2+3).

(2) Multiplying each of physical-layer priorities corresponding to the dynamic parameters by a corresponding coefficient and adding up the multiplication results to obtain the physical-layer priority of the service of the first terminal.

For example, the dynamic parameter A corresponds to the physical-layer priority 1 and corresponds to a coefficient a; the dynamic parameter B corresponds to the physical-layer priority 2 and corresponds to a coefficient b, and the dynamic parameter C corresponds to the physical-layer priority 3 and corresponds to a coefficient c. In this case, the physical-layer priority of the service of the first terminal is equal to 1*a+2*b+3*c.

The coefficient may be protocol-predefined, or may be configured by a network side, or may be obtained from a mapping relationship of other parameters, for example, being determined based on a received first parameter, where the first parameter is in correspondence with the coefficient.

Further, if physical-layer priorities of different services of the first terminal are the same, a transmission order of the different services of the first terminal is determined based on the higher-layer priorities of the services of the first terminal. For example, a service with a higher higher-layer priority may preempt a resource reserved for a service with a lower higher-layer priority.

In some implementations, the physical-layer priority of the first terminal may be updated according to a first update rule, and the first update rule may include one or more of the following:

(1) updating the physical-layer priority of the first terminal by the first terminal;
(2) carrying the physical-layer priority of the first terminal in sidelink control information;
(3) updating the physical-layer priority of the first terminal once each time a reserved resource of the first terminal is successfully preempted;
(4) keeping the physical-layer priority of the first terminal unchanged for failed preemption of a reserved resource of the first terminal; and
(5) updating the physical-layer priority of the first terminal per one or more of service, transport block (TB), bandwidth part (Band Width Part, BWP), carrier, and resource pool.

For example, if a service or transport block arrives, the physical-layer priority of the first terminal is initialized according to the physical-layer priority mapping rule.

For another example, if transmission of a current service or transport block has been completed, the physical-layer priority of the first terminal is reset.

In some implementations, the physical-layer priority is less than or equal to a maximum value. The maximum value may be protocol-predefined, or may be network-preconfigured, or may be obtained from a mapping relationship of other parameters, for example, being determined based on a received second parameter. The second parameter is in correspondence with the maximum value.

In some embodiments of this disclosure, during resource preemption, a manner for classifying and determining a candidate resource of the first terminal is described as follows.

In some implementations, the first terminal is a terminal that preempts a resource (which may be referred to as a preempting terminal), and the method shown in FIG. 2 may further include: determining a first candidate resource of the first terminal, and the first candidate resource includes one or more of the following:

(1) First-Priority Resource

Optionally, the first-priority resource includes one or more of the following: a first resource, where the first resource is a resource not occupied by another terminal; and a second resource, where the second resource is a resource occupied by another terminal and has smaller interference, for example, the second resource is a resource occupied by another terminal and a measured value of the second resource is less than a first threshold.

For example, an RSRP of the second resource is less than a defined SL-RSRP threshold, and the RSRP of the second resource is an RSRP obtained through measurement by the preempting terminal. The SL-RSRP threshold may be protocol-predefined, or configured by the network side, or obtained from a mapping relationship of other parameters.

(2) Second-Priority Resource

Optionally, the second-priority resource includes: a third resource, where the third resource is a resource occupied by a second terminal, a measured value of the third resource is greater than a second threshold, and a physical-layer priority of the second terminal is lower than the physical-layer priority of the first terminal. Optionally, the second threshold is equal to the first threshold, or the second threshold is greater than the first threshold.

For example, the third resource is a resource that is occupied by another terminal, with a related RSRP being greater than a defined SL-RSRP threshold but a physical-layer priority being lower than that of the first terminal. The SL-RSRP threshold of the second-priority resource may be the SL-RSRP threshold of the first-priority resource, or may be a threshold (such as a preempting SL-RSRP threshold) greater than the SL-RSRP threshold of the first-priority resource. The related RSRP is an RSRP obtained through measurement by the preempting terminal.

It can be understood that the step of determining the first candidate resource of the first terminal may be performed after step 201, or be performed before step 201, or be performed simultaneously with step 201. In other words, an order of the step of determining the first candidate resource of the first terminal and step 201 is not limited.

In some implementations, the first candidate resource needs to exclude a resource whose physical-layer priority is equal to a maximum value (or referred to as an upper limit) and that is indicated by SCI. For example, neither the first-priority resource nor the second-priority resource includes a fourth resource, and the fourth resource is a resource whose physical-layer priority is equal to the maximum value and that is indicated by sidelink control information of another terminal.

In some implementations, if there is no first-priority resource in a resource selection window, or if the first-priority resource exists in the resource selection window but the number of first-priority resources does not satisfy a preset condition (for example, in a selection window, a proportion of the first-priority resource is less than n %), a resource is selected from the second-priority resource as the first candidate resource (for example, until the selected first candidate resource reaches n % of all resources in the selection window).

Case 1: There is no first-priority resource in the selection window, the first candidate resource includes only the second-priority resource.

Case 2: The first-priority resource exists in the selection window, but the number of first-priority resources does not satisfy the preset condition. In this case, the first candidate resource includes all of the first-priority resource and part of the second-priority resource.

For example, all the resources in the resource selection window may be classified into a first-priority resource, a second-priority resource, and an non-selectable resource. The first candidate resource can be only a resource selected from the first-priority resource and/or the second-priority resource according to the following rule: first selecting from the first-priority resource, and if the first-priority resource is not enough, then selecting from the second-priority resource.

For example, the current resource selection window is 100 slots (100 resources), and it is determined that there are 15 first-priority resources, 20 second-priority resources, and 65 non-selectable resources. The preset condition is that the number of first candidate resources selected from the resource selection window is not less than 20. The first candidate resource is determined in the following manner:

first selecting 15 resources from the first-priority resources, which does not satisfy the preset condition, and then randomly selecting 5 of the second-priority resources. The transmission resource of the terminal is finally determined by randomly selecting from the first candidate resource.

In some embodiments of this disclosure, the first terminal is a terminal whose resource is preempted (which may be referred to as a preemptee terminal), and a step before or after step 201 shown in FIG. 2 or a step performed simultaneously with step 201 may further include:

receiving sidelink control information from a terminal that preempts a resource, where the sidelink control information indicates that another terminal preempting the resource preempts a resource of the first terminal, and indicates a physical-layer priority of the another terminal preempting the resource; and according to a first criterion, determining whether the first terminal performs resource reselection.

The first criterion includes one or more of the following (1) to (3):

(1) If a measured value of a resource preempted by another terminal is less than a third threshold (or referred to as a preempting SL-RSRP threshold), the first terminal does not perform resource reselection; otherwise, the first terminal performs resource reselection.

For example, if a related RSRP is less than a predefined or preconfigured preempting SL-RSRP threshold, the preemptee terminal does not perform resource reselection (that is, two terminals perform PSSCH transmission on the same time-frequency resource); otherwise, the preemptee terminal performs resource selection (reselection). The related RSRP is an RSRP obtained through measurement by the preemptee terminal.

Optionally, the preempting SL-RSRP threshold is determined in the following manners (a) to (d):

(a) The preempting SL-RSRP threshold is the same as or is different from the SL-RSRP threshold of the first-priority resource by X dB, and X is a positive integer.

(b) The preempting SL-RSRP threshold is related to or has a mapping relationship with one or more of the number of times of terminal resource reselection, delay count (the number of times being preempted), remaining time, past time, and proportion of the remaining time/past time to a PDB. Such mapping relationship may be protocol-predefined or configured by the network side.

For example, a larger quantity of times of UE resource reselection indicates a larger preempting SL-RSRP threshold; or an adjusting step of the preempting SL-RSRP threshold is A for the number of times of resource reselection being in a range of [a,b], and an adjusting step is B for that being in a range of [b,c]. It can be understood that multiple levels of adjusting steps can be set, but not being limited to two levels. The value of A or B may be set to 0.

(c) The preempting SL-RSRP threshold may be related to QoS, reliability, priority, delay, traffic type, service periodicity, or the like.

(d) The preempting SL-RSRP threshold may be protocol-predefined or network-preconfigured.

(2) If detecting at a first time point that a reserved resource is used as a reserved resource by another terminal, the first terminal uses the M-th slot corresponding to the first time point as a starting time point of a resource selection window and performs resource selection, where M is an integer greater than or equal to 0.

(3) If the physical-layer priority of the first terminal is equal to a maximum value, the first terminal does not perform resource reselection, for example, still performing PSSCH transmission on an original reserved resource.

In some implementations, the third threshold is determined based on one or more of the following: (1) the number of times of resource reselection by the first terminal; (2) delay count of a service; (3) third time, where the third time indicates duration between a current time point and a packet loss time point; (4) fourth time, where the fourth time indicates duration between a time point of packet generation and a current time point; (5) proportion of the third time or the fourth time to a packet delay budget; (6) quality of service of the service; (7) reliability of the service; (8) priority of the service; (9) resource type of the service; (10) periodicity of the service; and (11) data resource of the service.

For example, a higher reliability requirement indicates a larger preempting SL-RSRP threshold; or a preempting SL-RSRP threshold for a broadcast service is greater than that for a groupcast service, and the preempting SL-RSRP threshold for a groupcast service is greater than that for unicast; or a preempting SL-RSRP threshold for a resource allocated by the base station is greater than a resource allocated by the mode-2 UE; or a higher priority indicates a larger preempting SL-RSRP threshold.

In some implementations, the first threshold, the second threshold, and the third threshold are the same; or the second threshold and the third threshold are the same, and are greater than or less than the first threshold.

In some implementations, the first threshold, the second threshold, and the third threshold are protocol-predefined, or network-preconfigured, or determined based on a received third parameter. The third parameter is in correspondence with the first threshold, the second threshold, or the third threshold.

In some implementations, the first terminal is a receiving end whose resource is preempted, and a step before or after step 201 shown in FIG. 2 or a step performed simultaneously with step 201 may include any one of the following:

(1) In one or more time-frequency resource positions in which a physical sidelink shared channel is detected, receiving information carried on the physical sidelink shared channel.

(2) If sidelink control information received from a sending end includes resource reservation change information of the sending end, determining a time-frequency resource position of a physical sidelink shared channel based on the resource reservation change information; and based on the time-frequency resource position of the physical sidelink shared channel, receiving information carried on the physical sidelink shared channel.

For example, for one pair of receiving and sending terminals, if the resource reservation change information in the SCI is 0 (or 1), it is considered that a previous reserved resource is still a reserved resource of the sending end, and the receiving end performs reception in the plurality of time-frequency resource positions. If the resource reservation change information in the SCI is 1 (or 0), it is considered that the last reserved resource has been preempted, and the receiving end performs reception only in newly reserved time-frequency resource positions.

(3) If sidelink control information received from a sending end does not include resource reservation change information of the sending end, determining a time-frequency resource position of a physical sidelink shared channel based on one or more of a source identifier (source ID), destination identifier (destination ID), hybrid automatic repeat request identifier (HARQ ID), and resource reservation information that are related to a reserved resource; and based on the determined time-frequency resource position of the physical sidelink shared channel, receiving information carried on the physical sidelink shared channel.

For example, the receiving end performs determining based on changes of one or more of a source ID, destination ID, or HARQ ID of a specific reserved resource.

(4) Receiving, based on a rate matching pattern, information carried on the physical sidelink shared channel, that is, performing data demodulation not on a preempted resource.

Optionally, the rate-matching pattern may be protocol-predefined, or configured by the network side, or carried in the SCI by the sending end.

(5) dropping reception of information carried on the physical sidelink shared channel in a position of a preempted resource.

(6) Sending feedback information to a terminal whose resource is preempted, where the feedback information indicates that the resource has been preempted.

This is applicable to a case that the preemptee terminal itself has possibly not detected that the resource has been preempted.

(7) Sending a hybrid automatic repeat request feedback to a sending end, where the hybrid automatic repeat request feedback indicates a physical sidelink feedback channel resource mapped to a physical sidelink shared channel of a terminal preempting a resource, or a physical sidelink feedback channel resource mapped to a physical sidelink shared channel of a terminal whose resource is preempted. Optionally, the hybrid automatic repeat request feedback is determined through scrambling or feedback sequence shifting.

For example, when a physical sidelink feedback channel (PSFCH) resource is determined according to an implicit mapping rule (for example, the PSFCH resource is a resource on the 0th, the 1st, or the n-th slot behind a related PSSCH resource), the PSFCH resource mapped to the PSSCH of the preempting terminal may be the same as the PSFCH mapped to the PSSCH of the preemptee terminal. As a result, the sending end cannot distinguish whether the HARQ feedback corresponds to a transport block (TB) of the preempting terminal or a transport block (TB) of the preemptee terminal.

In some implementations, when the first terminal is a receiving end preempting a resource or other detection terminals, the first terminal sends a HARQ feedback to the sending end, and the HARQ feedback may be obtained through scrambling or feedback sequence shifting.

In some implementations, the physical-layer priority count value of the first terminal is updated based on a second update rule, where the second update rule includes one or more of the following:

(1) updating the physical-layer priority count value of the first terminal by the first terminal;

(2) carrying the physical-layer priority count value of the first terminal in sidelink control information;

(3) incrementing the physical-layer priority count value of the first terminal by N each time a reserved resource of the first terminal is successfully preempted, where N is protocol-predefined, or network-configured, or determined based on a received fourth parameter, and the fourth parameter is in correspondence with N;

(4) making the initial physical-layer priority count value of the first terminal to be equal to zero if a reserved source of the first terminal has never been preempted; and (5) resetting the physical-layer priority count value of the first terminal to zero if transmission of a current service has been completed.

In some implementations, the physical-layer priority count value is less than or equal to a maximum value. The maximum value may be protocol-predefined, or may be network-preconfigured, or may be determined based on a received fifth parameter. The fifth parameter is in correspondence with the maximum value.

The fifth parameter may be physical-layer priority, higher-layer parameter (such as 5QI, priority level, QoS indicator, reliability, priority, or delay), traffic type, the number of times of being preempted, transmission type, or the like. For example, maximum value for broadcast service>maximum value for groupcast>maximum value for unicast service.

In some implementations, the first terminal is a terminal preempting a resource, and a step before or after step 201 shown in FIG. 2 or a step performed simultaneously with step 201 may further include:

preempting a fifth resource of another terminal (or referred to as a preemptee terminal) based on a physical-layer priority or a higher-layer priority, where a physical-layer priority count value of the fifth resource is less than a maximum value.

In some implementations, the first terminal is a terminal preempting a resource, and a step before or after step 201 shown in FIG. 2 or a step performed simultaneously with step 201 may further include:

determining a second candidate resource of the first terminal, where the second candidate resource includes one or more of the following: a sixth resource, where the sixth resource is a resource not occupied by another terminal; and a seventh resource, where the seventh resource is a resource occupied by another terminal, and a measured value of the seventh resource is less than a fourth threshold.

In some implementations, the second candidate resource does not include a ninth resource, and the ninth resource is a resource whose physical-layer priority count value is equal to a maximum value and that is indicated by sidelink control information of another terminal.

In some implementations, the first terminal is a terminal whose resource is preempted, and a step before or after step 201 shown in FIG. 2 or a step performed simultaneously with step 201 may further include:

receiving sidelink control information from a terminal that preempts a resource, where the sidelink control information indicates that another terminal preempting the resource preempts a resource of the first terminal, and indicates a physical-layer priority of the another terminal preempting the resource; and according to a second criterion, determining whether the first terminal performs resource reselection; where the second criterion includes one or more of the following:

(1) if a measured value of a resource preempted by another terminal is less than a fifth threshold, the first terminal does not perform resource reselection; otherwise, the first terminal performs resource reselection;

(2) if detecting at a second time point that a reserved resource is used as a reserved resource by another terminal, the first terminal uses the Y-th slot corresponding to the second time point as a starting time point of a resource selection window, and performs resource selection, where Y is an integer greater than or equal to 0; and (3) if the physical-layer priority count value of the first terminal is equal to a maximum value, the first terminal does not perform resource reselection.

In some implementations, the fourth threshold and the fifth threshold are the same; or the fifth threshold is greater than or less than the fourth threshold.

In some implementations, the fourth threshold and the fifth threshold are protocol-predefined, or network-preconfigured, or determined based on a received sixth parameter. The sixth parameter is in correspondence with the fourth threshold and the fifth threshold.

In some embodiments of this disclosure, the physical-layer priority is defined and used to ensure transmission of high-reliability low-latency services and reduce negative impact of the resource preemption mechanism on low priority terminals, thereby improving overall performance of a system.

Embodiment 1

This embodiment describes a mapping relationship between higher-layer parameters and physical-layer priorities that is protocol-predefined or preconfigured by the network side. For details, refer to Table 1 to Table 5.

TABLE 1

| Physical-layer priority value (Physical priority Value) | PC5 quality of service identifier value (PQI Value) | Resource type | Default priority level | Data delay budget (Packet Delay Budget) | Packet error rate | Default maximum data burst volume | Default averaging window |
|---|---|---|---|---|---|---|---|
| 1 | 1 | Guaranteed bit rate (GBR) | 3 | 20 milliseconds (ms) | $10^{-4}$ | N/A | 2000 ms |
| 2 | 2 | | 4 | 50 ms | $10^{-2}$ | N/A | 2000 ms |
| 3 | 3 | | 3 | 100 ms | $10^{-4}$ | N/A | 2000 ms |
| 4 | 55 | Non-guaranteed bit rate (Non-GBR) | 3 | 10 ms | $10^{-4}$ | N/A | N/A |
| 5 | 56 | | 6 | 20 ms | $10^{-1}$ | N/A | N/A |
| 6 | 57 | | 5 | 25 ms | $10^{-1}$ | N/A | N/A |
| 7 | 58 | | 4 | 100 ms | $10^{-2}$ | N/A | N/A |
| 8 | 59 | | 6 | 500 ms | $10^{-1}$ | N/A | N/A |
| 9 | 82 | Delay critical guaranteed bit rate (Delay Critical GBR) | 3 | 10 ms | $10^{-4}$ | 2000 bytes (bytes) | 2000 ms |
| 10 | 83 | | 2 | 3 ms | $10^{-5}$ | 2000 bytes | 2000 ms |

TABLE 2

| Physical priority Value | PQI Value | Resource type | Default Priority Level | Packet Delay Budget | Packet Error Rate | Default Maximum data burst volume | Default Averaging Window |
|---|---|---|---|---|---|---|---|
| 1 | 1 | GBR | 3 | 20 ms | $10^{-4}$ | N/A | 2000 ms |
|   | 2 |     | 4 | 50 ms | $10^{-2}$ | N/A | 2000 ms |
|   | 3 |     | 3 | 100 ms | $10^{-4}$ | N/A | 2000 ms |
| 2 | 55 | Non-GBR | 3 | 10 ms | $10^{-4}$ | N/A | N/A |
|   | 56 |     | 6 | 20 ms | $10^{-1}$ | N/A | N/A |
|   | 57 |     | 5 | 25 ms | $10^{-1}$ | N/A | N/A |
|   | 58 |     | 4 | 100 ms | $10^{-2}$ | N/A | N/A |
|   | 59 |     | 6 | 500 ms | $10^{-1}$ | N/A | N/A |
| 3 | 82 | Delay Critical GBR | 3 | 10 ms | $10^{-4}$ | 2000 bytes | 2000 ms |
|   | 83 |     | 2 | 3 ms | $10^{-5}$ | 2000 bytes | 2000 ms |

TABLE 3

| Physical priority Value | PQI Value | Resource type | Default Priority Level | Packet Delay Budget | Packet Error Rate | Default Maximum data burst volume | Default Averaging Window |
|---|---|---|---|---|---|---|---|
| 1 | 1 | GBR | 3 | 20 ms | $10^{-4}$ | N/A | 2000 ms |
| 2 | 2 |     | 4 | 50 ms | $10^{-2}$ | N/A | 2000 ms |
| 3 | 3 |     | 3 | 100 ms | $10^{-4}$ | N/A | 2000 ms |
| 55 | 55 | Non-GBR | 3 | 10 ms | $10^{-4}$ | N/A | N/A |
| 56 | 56 |     | 6 | 20 ms | $10^{-1}$ | N/A | N/A |
| 57 | 57 |     | 5 | 25 ms | $10^{-1}$ | N/A | N/A |
| 58 | 58 |     | 4 | 100 ms | $10^{-2}$ | N/A | N/A |
| 59 | 59 |     | 6 | 500 ms | $10^{-1}$ | N/A | N/A |
| 82 | 82 | Delay Critical GBR | 3 | 10 ms | $10^{-4}$ | 2000 bytes | 2000 ms |
| 83 | 83 |     | 2 | 3 ms | $10^{-5}$ | 2000 bytes | 2000 ms |

TABLE 4

| Physical priority Value | PQI Value | Resource type | Default Priority Level | Packet Delay Budget | Packet Error Rate | Default Maximum data burst volume | Default Averaging Window |
|---|---|---|---|---|---|---|---|
| 3 | 1 | GBR | 3 | 20 ms | $10^{-4}$ | N/A | 2000 ms |
| 4 | 2 |     | 4 | 50 ms | $10^{-2}$ | N/A | 2000 ms |
| 3 | 3 |     | 3 | 100 ms | $10^{-4}$ | N/A | 2000 ms |
| 3 | 55 | Non-GBR | 3 | 10 ms | $10^{-4}$ | N/A | N/A |
| 6 | 56 |     | 6 | 20 ms | $10^{-1}$ | N/A | N/A |
| 5 | 57 |     | 5 | 25 ms | $10^{-1}$ | N/A | N/A |
| 4 | 58 |     | 4 | 100 ms | $10^{-2}$ | N/A | N/A |
| 6 | 59 |     | 6 | 500 ms | $10^{-1}$ | N/A | N/A |
| 3 | 82 | Delay Critical GBR | 3 | 10 ms | $10^{-4}$ | 2000 bytes | 2000 ms |
| 2 | 83 |     | 2 | 3 ms | $10^{-5}$ | 2000 bytes | 2000 ms |

TABLE 5

| Physical priority Value | PQI Value | Resource type | Default Priority Level | Packet Delay Budget | Packet Error Rate | Default Maximum data burst volume | Default Averaging Window |
|---|---|---|---|---|---|---|---|
| 2 | 1 | GBR | 3 | 20 ms | $10^{-4}$ | N/A | 2000 ms |
| 3 | 2 |     | 4 | 50 ms | $10^{-2}$ | N/A | 2000 ms |
| 2 | 3 |     | 3 | 100 ms | $10^{-4}$ | N/A | 2000 ms |
| 2 | 55 | Non-GBR | 3 | 10 ms | $10^{-4}$ | N/A | N/A |
| 5 | 56 |     | 6 | 20 ms | $10^{-1}$ | N/A | N/A |

TABLE 5-continued

| Physical priority Value | PQI Value | Resource type | Default Priority Level | Packet Delay Budget | Packet Error Rate | Default Maximum data burst volume | Default Averaging Window |
|---|---|---|---|---|---|---|---|
| 4 | 57 | | 5 | 25 ms | $10^{-1}$ | N/A | N/A |
| 3 | 58 | | 4 | 100 ms | $10^{-2}$ | N/A | N/A |
| 5 | 59 | | 6 | 500 ms | $10^{-1}$ | N/A | N/A |
| 2 | 82 | Delay Critical GBR | 3 | 10 ms | $10^{-4}$ | 2000 bytes | 2000 ms |
| 1 | 83 | | 2 | 3 ms | $10^{-5}$ | 2000 bytes | 2000 ms |

Embodiment 2

This embodiment describes a mapping relationship between dynamic parameters related to the terminal and physical-layer priorities that is protocol-predefined or pre-configured by the network side. For details, refer to Table 6.

TABLE 6

| Physical-layer priority | 5G quality of service identifier (5QI) | Traffic type | Remaining time (ms) | Number of times being preempted |
|---|---|---|---|---|
| 0 | 1 or 2 | | 10 | 0 |
| 1 | 3 or 4 | Unicast | 9 | 1 |
| 2 | 5 or 6 | | 8 | 2 |
| 3 | 7 or 8 | Groupcast | 7 | 3 |
| 4 | 9 or 10 | | 6 | 4 |
| 5 | 11 or 12 | Broadcast | 5 | 5 |
| 6 | 13 or 14 | | 4 | 6 |
| ... | ... | | ... | ... |

A service of the UE1 is a groupcast service, with a value of 5QI being 11, a remaining time being 8 ms, and the number of times being preempted being 0. A service of the UE2 is a unicast service, with a value of 5QI being 7, a remaining time being 5 ms, and the number of times being preempted being 3.

A physical-layer priority of the UE1 is 3+5+2+0=10; and a physical-layer priority of the UE2 is 1+3+5+3=12. Therefore, the physical-layer priority of the UE2 is higher than the physical-layer priority of the UE1.

Embodiment 3

Figure 3:
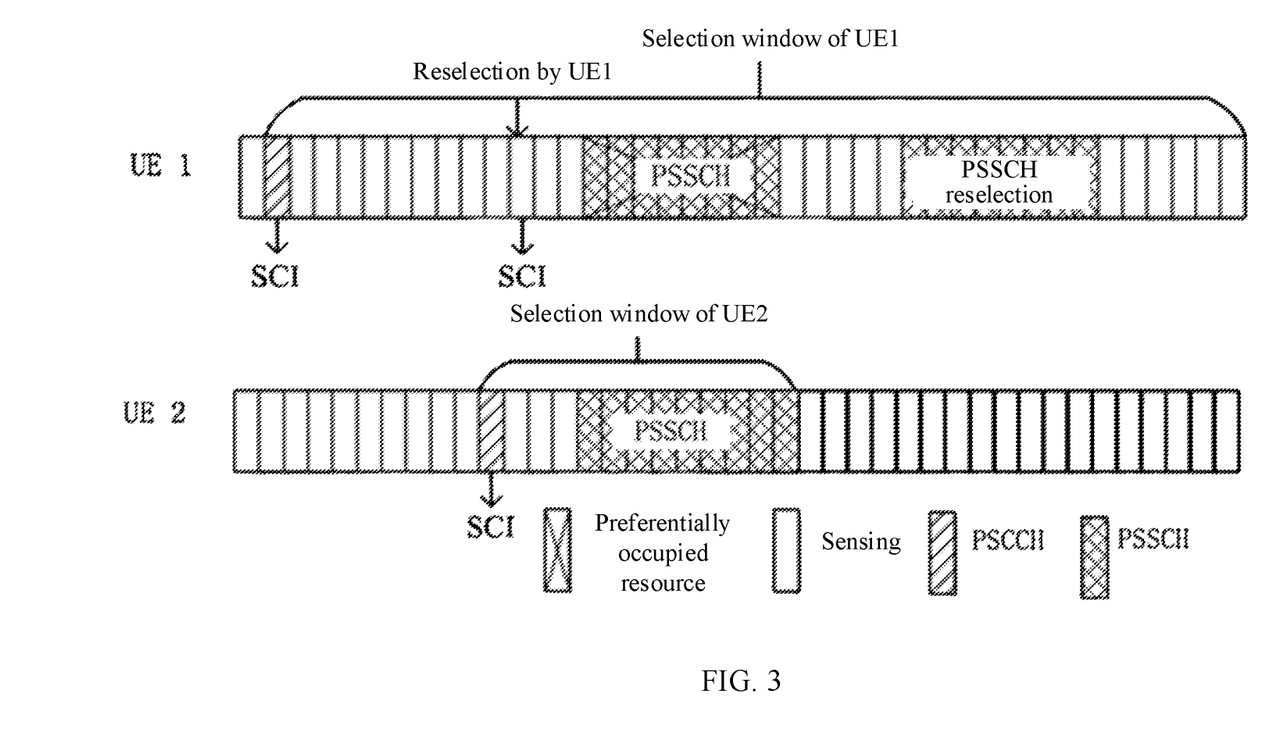
FIG. 3 is a schematic diagram of resource preemption according to some embodiments of this disclosure.

With reference to FIG. 3, this embodiment describes a resource preempting process, including the following specific steps:

Step 1: UE1 reserves a resource slot X at a time point of TTI=n, and the UE1 obtains a physical-layer priority 10 of the UE1 according to a physical-layer priority mapping rule, and broadcasts information such as the physical-layer priority by using sidelink control information.

Step 2: UE2 receives the sidelink control information broadcast by the UE1 to obtain the physical-layer priority of the UE1.

Step 3: The UE2 receives a packet at a time point of TTI=n+5, and learns that a physical-layer priority of the UE2 is 12 according to the physical-layer priority mapping rule.

Step 4: The UE2 determines a candidate resource.

(a) The UE2 compares an RSRP between the UE1 and the UE2 that is measured in a sensing phase against a predefined SL-RSRP threshold.

(b) If the RSRP is greater than the SL-RSRP threshold, and the physical-layer priority of the UE2 is higher than the physical-layer priority of the UE1, the UE2 uses the resource slot X reserved by the UE1 as a candidate resource.

Step 5: The UE2 randomly selects a reserved resource from all the candidate resources, and preempts the resource slot X reserved by the UE1. The UE2 broadcasts sidelink control information.

Step 6: The UE1 receives the sidelink control information broadcast by the UE2 to learn about preemption information of the UE2, and measures an RSRP between the UE1 and the UE2.

Step 7: The UE1 compares the RSRP and the preempting SL-RSRP threshold.

Step 8: If the RSRP is less than the preempting SL-RSRP threshold, the UE1 does not perform resource reselection, that is, two UEs performs physical sidelink shared channel transmission on the same time-frequency resource; otherwise, the UE1 performs resource selection (reselection) and broadcasts sidelink control information.

Embodiment 4

1. The higher-layer priority corresponding to a service of the UE1 is 1, the higher-layer priority corresponding to a service of the UE2 is 3, and the higher-layer priority corresponding to a service of the UE3 is 4.

2. An initial physical-layer priority count value (counter) of the UE1 is 0, and the reserved resource of the UE1 is a slot X.

3. The higher-layer priority corresponding to the service of the UE2 is greater than the higher-layer priority corresponding to the service of the UE1. For the UE2, the resource reserved by the UE1 is a candidate resource.

4. The UE2 randomly selects a reserved resource from the candidate resource, and preempts the resource slot X reserved by the UE1. The UE2 broadcasts sidelink control information.

5. The UE1 receives the sidelink control information to learn about the preemption behavior, and triggers updating of the physical-layer priority count value (counter). The physical-layer priority count value (counter) changes to 5. An upper limit (maximum value) of the physical-layer priority count value (counter) is also 5.

6. The UE1 reselects a reserved resource slot Y based on a sensing result, and broadcasts sidelink control information.

7. The UE3 receives the sidelink control information to obtain the physical-layer priority count values (counter) of the UE1 and UE2, being 5 and 0, respectively.

8. When the UE3 receives a packet and triggers resource selection, because the higher-layer priority corresponding to the service of the UE3 is higher than the higher-layer priorities corresponding to the services of the UE1 and the UE2 and the physical-layer priority count value (counter) of the UE1 has reached the upper limit (maximum value), the UE3 cannot consider the resource reserved by the UE1 as a candidate resource, but can consider the resource reserved by the UE2 as a candidate resource.

Figure 4:
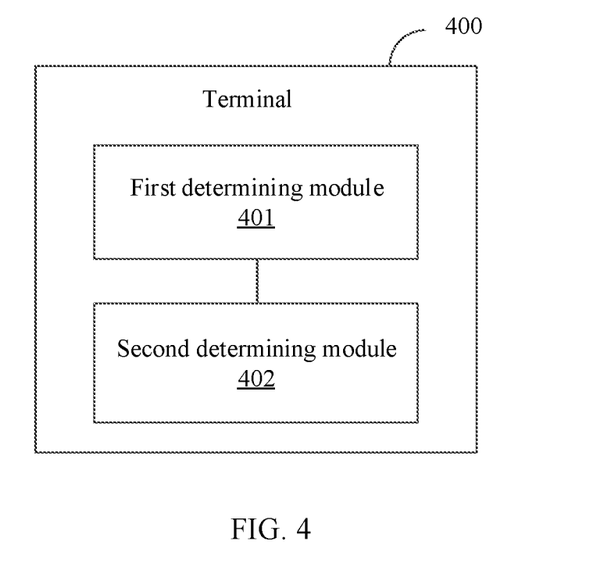
FIG. 4 is a first schematic diagram of a first terminal according to some embodiments of this disclosure.

Referring to FIG. 4, some embodiments of this disclosure further provide a terminal, where the terminal 400 is a first terminal, and the terminal 400 includes:

- a first determining module 401, configured to determine a physical-layer priority mapping rule; and
- a second determining module 402, configured to determine a physical-layer priority or physical-layer priority count value of the first terminal according to the physical-layer priority mapping rule; where
- the physical-layer priority or the physical-layer priority count value is used for determining a transmission resource for the first terminal.

In some implementations, the physical-layer priority mapping rule is protocol-predefined, or network-configured, or configured by a higher-layer application.

In some implementations, the physical-layer priority mapping rule includes: a mapping relationship between higher-layer parameters of the first terminal and physical-layer priorities; where the higher-layer parameter includes one or more of the following:
quality of service identifier, such as a PC5 quality of service identifier;
resource type;
priority value (or referred to as default priority level);
data delay;
packet error rate;
maximum data burst volume (or referred to as default maximum data burst volume); and
averaging window (or referred to as default averaging window).

In some implementations, the mapping relationship between higher-layer parameters of the first terminal and physical-layer priorities is protocol-predefined, or network-configured, or configured by a higher-layer application.

In some implementations, the physical-layer priority mapping rule includes: a mapping relationship between dynamic parameters related to the first terminal and physical-layer priorities; where the dynamic parameter related to the first terminal includes one or more of the following:
quality of service identifier, such as a 5G quality of service identifier;
first time, where the first time indicates duration between a current time point and a packet loss time point;
second time, where the second time indicates duration between a time point of packet generation and a current time point;
proportion of the first time or the second time to a packet delay budget;
service information;
transmission type;
transmission distance;
resource allocation node;
resource reservation node; and
delay count.

In some implementations, the determining a physical-layer priority of the first terminal according to the physical-layer priority mapping rule includes:

obtaining the physical-layer priority of the first terminal through calculation based on the mapping relationship between dynamic parameters and physical-layer priorities.

In some implementations, the obtaining the physical-layer priority of the first terminal through calculation based on the mapping relationship between dynamic parameters and physical-layer priorities includes:

adding up physical-layer priorities corresponding to the dynamic parameters to obtain the physical-layer priority of the first terminal;
or
multiplying each of physical-layer priorities corresponding to the dynamic parameters by a corresponding coefficient and adding up the multiplication results to obtain the physical-layer priority of the first terminal.

In some implementations, the terminal 400 further includes: a third determining module, configured to: if physical-layer priorities of different services of the first terminal are the same, determine a transmission order of the different services of the first terminal based on the higher-layer priorities of the services of the first terminal.

In some implementations, a coefficient corresponding to the dynamic parameter related to the first terminal is protocol-predefined, or configured by a network side, or determined based on a received first parameter, where the first parameter is in correspondence with the coefficient.

In some implementations, the mapping relationship between dynamic parameters related to the first terminal and physical-layer priorities is protocol-predefined, or network side-configured, or configured by a higher-layer application.

In some implementations, the physical-layer priority of the first terminal is updated based on a first update rule, where the first update rule includes one or more of the following:

updating the physical-layer priority of the first terminal by the first terminal;
carrying the physical-layer priority of the first terminal in sidelink control information;
updating the physical-layer priority of the first terminal once each time a reserved resource of the first terminal is successfully preempted;
keeping the physical-layer priority of the first terminal unchanged for failed preemption of a reserved resource of the first terminal; and
updating the physical-layer priority of the first terminal per one or more of service, transport block, bandwidth part, carrier, and resource pool.

In some implementations, the updating the physical-layer priority of the first terminal per service or transport block includes:

if a service or transport block arrives, initializing the physical-layer priority of the first terminal according to the physical-layer priority mapping rule; and
if transmission of a current service or transport block has been completed, resetting the physical-layer priority of the first terminal.

In some implementations, the physical-layer priority is less than or equal to a maximum value. The maximum value is protocol-predefined, or network-preconfigured, or determined based on a received second parameter. The second parameter is in correspondence with the maximum value.

In some implementations, the first terminal is a terminal that preempts a resource, and the terminal 400 further includes:

a fourth determining module, configured to: determine a first candidate resource of the first terminal, where the first candidate resource includes one or more of the following:
a first-priority resource; and
a second-priority resource; where the first-priority resource includes one or more of the following: a first resource, where the first resource is a resource not occupied by another terminal; and a second resource, where the second resource is a resource occupied by another terminal, and a measured value of the second resource is less than a first threshold; and the second-priority resource includes: a third resource, where the third resource is a resource occupied by a second terminal, a measured value of the third resource is greater than a second threshold, and a physical-layer priority of the second terminal is lower than the physical-layer priority of the first terminal.

In some implementations, neither the first-priority resource nor the second-priority resource includes a fourth resource, and the fourth resource is a resource whose physical-layer priority is equal to a maximum value and that is indicated by sidelink control information of the another terminal.

In some implementations, if there is no first-priority resource in a resource selection window, or if the first-priority resource exists in the resource selection window but the number of first-priority resources does not satisfy a preset condition (for example, in a selection window, a proportion of the first-priority resource is less than n %), a resource is selected from the second-priority resource as the first candidate resource (for example, until the selected first candidate resource reaches n % of all resources in the selection window).

In some implementations, the first terminal is a terminal whose resource is preempted, and the terminal 400 further includes:

a fifth determining module, configured to: according to a first criterion, determine whether the first terminal performs resource reselection; where the first criterion includes one or more of the following:

if a measured value of a resource preempted by another terminal is less than a third threshold, the first terminal does not perform resource reselection; otherwise, the first terminal performs resource reselection;

if detecting at a first time point that a reserved resource is used as a reserved resource by another terminal, the first terminal uses the M-th slot corresponding to the first time point as a starting time point of a resource selection window and performs resource selection, where M is an integer greater than or equal to 0; and if the physical-layer priority of the first terminal is equal to a maximum value, the first terminal does not perform resource reselection.

In some implementations, the third threshold is determined based on one or more of the following:

the number of times of resource reselection for the first terminal;

delay count;

third time, where the third time indicates duration between a current time point and a packet loss time point;

fourth time, where the fourth time indicates duration between a time point of packet generation and a current time point;

proportion of the third time or the fourth time to a packet delay budget;

quality of service;

reliability;

priority;

resource type;

periodicity; and data resource.

In some implementations, the first threshold, the second threshold, and the third threshold are the same;

or the second threshold and the third threshold are the same, and are greater than or less than the first threshold.

In some implementations, the first threshold, the second threshold, and the third threshold are protocol-predefined, or network-preconfigured, or determined based on a received third parameter. The third parameter is in correspondence with the first threshold, the second threshold, or the third threshold.

In some implementations, the first terminal is a receiving end, and the terminal 400 further includes: a first processing module configured to perform any one of the following:

(1) in one or more time-frequency resource positions in which a physical sidelink shared channel is detected, receiving information carried on the physical sidelink shared channel;

(2) if sidelink control information received from a sending end includes resource reservation change information of the sending end, determining a time-frequency resource position of a physical sidelink shared channel based on the resource reservation change information; and based on the time-frequency resource position of the physical sidelink shared channel, receiving information carried on the physical sidelink shared channel;

(3) if sidelink control information received from a sending end does not include resource reservation change information of the sending end, determining a time-frequency resource position of a physical sidelink shared channel based on one or more of a source identifier, destination identifier, hybrid automatic repeat request identifier, and resource reservation information that are related to a reserved resource; and based on the determined time-frequency resource position of the physical sidelink shared channel, receiving information carried on the physical sidelink shared channel;

(4) receiving, based on a rate matching pattern, information carried on the physical sidelink shared channel;

(5) dropping reception of information carried on the physical sidelink shared channel in a position of a preempted resource;

(6) sending feedback information to a terminal whose resource is preempted, where the feedback information indicates that the resource has been preempted; and (7) sending a hybrid automatic repeat request feedback to a sending end, where the hybrid automatic repeat request feedback indicates a physical sidelink feedback channel resource mapped to a physical sidelink shared channel of a terminal preempting a resource, or a physical sidelink feedback channel resource mapped to a physical sidelink shared channel of a terminal whose resource is preempted.

In some implementations, the physical-layer priority count value of the first terminal is updated based on a second update rule, where the second update rule includes one or more of the following:

updating the physical-layer priority count value of the first terminal by the first terminal;

carrying the physical-layer priority count value of the first terminal in sidelink control information;

incrementing the physical-layer priority count value of the first terminal by N each time a reserved resource of the first terminal is successfully preempted, where N is protocol-predefined, or network-configured, or determined based on a received fourth parameter, and the fourth parameter is in correspondence with N;

making the physical-layer priority count value of the first terminal to be equal to zero if a reserved source of the first terminal has never been preempted; and resetting the physical-layer priority count value of the first terminal to zero if transmission of a current service has been completed.

In some implementations, the physical-layer priority count value is less than or equal to a maximum value. The maximum value is protocol-predefined, or network-preconfigured, or determined based on a received fifth parameter. The fifth parameter is in correspondence with the maximum value.

In some implementations, the first terminal is a terminal that preempts a resource, and the first terminal further includes: a second processing module, configured to preempt a fifth resource of another terminal based on a physical-layer priority or a higher-layer priority, where a physical-layer priority count value of the fifth resource is less than a maximum value.

In some implementations, the first terminal is a terminal that preempts a resource, and the terminal 400 further includes: a sixth determining module, configured to: determine a second candidate resource of the first terminal, where the second candidate resource includes one or more of the following:

a sixth resource, where the sixth resource is a resource not occupied by another terminal; and a seventh resource, where the seventh resource is a resource occupied by another terminal, and a measured value of the seventh resource is less than a fourth threshold.

In some implementations, the second candidate resource does not include an eighth resource, and the eighth resource is a resource whose physical-layer priority count value is equal to a maximum value and that is indicated by sidelink control information of another terminal.

In some implementations, the first terminal is a terminal whose resource is preempted, and the first terminal further includes: a seventh determining module, configured to: according to a second criterion, determine whether the first terminal performs resource reselection; where the second criterion includes one or more of the following:

if a measured value of a resource preempted by another terminal is less than a fifth threshold, the first terminal does not perform resource reselection; otherwise, the first terminal performs resource reselection;

if detecting at a second time point that a reserved resource is used as a reserved resource by another terminal, the first terminal uses the Y-th slot corresponding to the second time point as a starting time point of a resource selection window, and performs resource selection, where Y is an integer greater than or equal to 0; and if the physical-layer priority count value of the first terminal is equal to a maximum value, the first terminal does not perform resource reselection.

In some implementations, the fourth threshold and the fifth threshold are the same; or the fifth threshold is greater than or less than the fourth threshold.

In some implementations, the fourth threshold and the fifth threshold are protocol-predefined, or network-preconfigured, or determined based on a received sixth parameter. The sixth parameter is in correspondence with the fourth threshold or the fifth threshold.

The terminal provided in some embodiments of this disclosure may execute the foregoing embodiments shown in FIG. 2, implementation principles and technical effects thereof are similar, and details are not described herein again in this embodiment.

Figure 5:
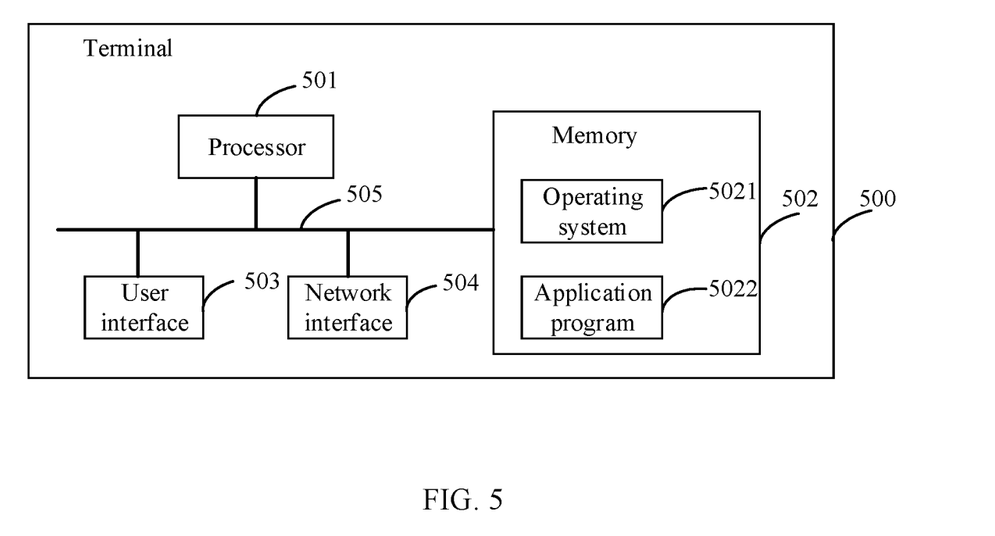
FIG. 5 is a second schematic diagram of a first terminal according to some embodiments of this disclosure.

As shown in FIG. 5, the terminal 500 shown in FIG. 5 includes at least one processor 501, a memory 502, at least one network interface 504, and a user interface 503. The components of the terminal 500 are coupled together by using the bus system 505. It can be understood that the bus system 505 is configured to implement connection communication between these components. The bus system 505 may include not only a data bus but also a power supply bus, a control bus, and a status signal bus. However, for clear description, various buses in FIG. 5 are marked as the bus system 505.

The user interface 503 may include a display, a keyboard, a click device (for example, a mouse or a trackball), a touch board, or a touchscreen.

It can be understood that the memory 502 in some embodiments of this disclosure may be a volatile memory or a non-volatile memory, or may include both a volatile memory and a non-volatile memory. The non-volatile memory may be a read-only memory (ROM), a programmable read-only memory (ROM), an erasable programmable read-only memory (EPROM), an electrically erasable programmable read-only memory (EEPROM), or a flash memory. The volatile memory may be a random access memory (RAM), and serves as an external cache. For illustrative rather than limitative description, many forms of RAMs are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct memory bus random access memory (DRRAM). The memory 502 in the system and method described in some embodiments of this disclosure is intended to include but is not limited to these and any other appropriate types of memories.

In some implementations, the memory 502 stores the following elements: an executable module or a data structure, or a subset thereof, or an extended set thereof: an operating system 5021 and an application program 5022.

The operating system 5021 includes various system programs, such as a framework layer, a kernel library layer, and a driver layer, and is configured to implement various basic services and process hardware-based tasks. The application program 5022 includes various application programs, such as a media player, and a browser, and is configured to implement various application services. A program that implements the methods of some embodiments of this disclosure may be included in the application program 5022.

In an embodiment of this disclosure, a program or an instruction stored in the memory 502, specifically, a program or an instruction stored in the application program 5022 is invoked, and the steps of the method in FIG. 2 are implemented during execution of the program or instruction.

The terminal provided in some embodiments of this disclosure may execute the foregoing method embodiments shown in FIG. 2, implementation principles and technical effects thereof are similar, and details are not described herein again in this embodiment.

The steps of the method or algorithm described with reference with content disclosed in this disclosure may be implemented in a hardware manner, or may be implemented in a manner in which a processor executes software instructions. The software instruction may include a corresponding software module. The software module may be stored in a Random Access Memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory, or a storage medium in any other forms well-known in the art. For example, a storage medium is coupled to a processor, so that the processor can read information from the storage medium or write information into the storage medium. Certainly, the storage medium may alternatively be a component of the processor. The processor and the storage medium may be carried in an application-specific integrated circuit (ASIC). In addition, the ASIC may be carried in a core network interface device. Certainly, the processor and the storage medium may alternatively exist in the core network interface device as discrete components.

A person of skill in the art should be able to realize that in one or more of the foregoing examples, the functions described in this disclosure may be implemented by using hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

It can be understood that the embodiments described some embodiments in this disclosure may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

The objectives, technical solutions, and benefits of this disclosure are further described in detail in the foregoing specific embodiments. It should be understood that the foregoing descriptions are only specific embodiments of this disclosure, but are not intended to limit the protection scope of this disclosure. Any modification, equivalent replacement, or improvement made within the spirit and principle of this disclosure shall fall within the protection scope of this disclosure.

A person skilled in the art should understand that the embodiments of this disclosure may be provided as a method, a system, or a computer program product. Therefore, some embodiments of this disclosure may use a form of hardware only embodiments, software only embodiments, or embodiments with a combination of software and hardware. Moreover, some embodiments of this disclosure may use a form of a computer program product that is implemented on one or more computer-usable storage media (including but not limited to a disk memory, a CD-ROM, an optical memory, and the like) that include computer-usable program code.

Some embodiments of this disclosure are described with reference to the flowcharts and/or block diagrams of the method, the device (system), and the computer program product according to some embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to some embodiments of this disclosure without departing from the spirit and scope of this disclosure. This disclosure is intended to cover these modifications and variations provided that the modifications and variations in some embodiments of this disclosure fall within the protection scope defined by the following claims and their equivalent technologies.

What is claimed is:

1. A sidelink congestion control method, applied to a first terminal and comprising:
receiving a physical-layer priority mapping rule from a network side device, wherein the physical-layer priority mapping rule comprises at least one of: a mapping relationship between one or more service quality identifiers of the first terminal and physical-layer priorities, and one or more priority values and physical-layer priorities; and
determining a physical-layer priority of the first terminal according to the physical-layer priority mapping rule; wherein
the physical-layer priority is used for determining a transmission resource for the first terminal;
if a measured RSRP value of a resource indicated by a received sidelink control information (SCI) is less than a SL-RSRP threshold, the first terminal does not perform resource reselection;

if the measured RSRP value of the resource indicated by the received SCI is greater than or equal to the SL-RSRP threshold, the first terminal performs resource reselection.

2. The method according to claim 1, wherein the physical-layer priority mapping rule further comprises: a mapping relationship between one or more of the following higher-layer parameters of the first terminal and the physical-layer priorities:
resource type;
data delay;
packet error rate;
maximum data burst volume; or
averaging window.

3. The method according to claim 1, wherein the priority of the service quality identifier is higher, the physical-layer priority is higher.

4. The method according to claim 1, wherein the physical-layer priority of the first terminal is updated according to a first update rule, and the first update rule comprises one or more of the following:
updating the physical-layer priority of the first terminal by the first terminal;
carrying the physical-layer priority of the first terminal in sidelink control information;
updating the physical-layer priority of the first terminal once each time a reserved resource of the first terminal is successfully preempted;
keeping the physical-layer priority of the first terminal unchanged for failed preemption of a reserved resource of the first terminal; and
updating the physical-layer priority of the first terminal per one or more of service, transport block, bandwidth part, carrier, and resource pool.

5. The method according to claim 4, wherein the updating the physical-layer priority of the first terminal per service or transport block comprises:
if a service or transport block arrives, initializing the physical-layer priority of the first terminal according to the physical-layer priority mapping rule; and
if transmission of a current service or transport block has been completed, resetting the physical-layer priority of the first terminal.

6. A terminal, comprising a processor, a memory, and a program stored in the memory and capable of running on the processor, wherein the terminal is a first terminal, and when the program is executed by the processor, the following steps are implemented:
receiving a physical-layer priority mapping rule from a network side device, wherein the physical-layer priority mapping rule comprises at least one of: a mapping relationship between one or more service quality identifiers of the first terminal and physical-layer priorities, and one or more priority values and physical-layer priorities; and
determining a physical-layer priority of the first terminal according to the physical-layer priority mapping rule; wherein
the physical-layer priority is used for determining a transmission resource for the first terminal;
if a measured RSRP value of a resource indicated by a received sidelink control information (SCI) is less than a SL-RSRP threshold, the first terminal does not perform resource reselection;
if the measured RSRP value of the resource indicated by the received SCI is greater than or equal to the SL-RSRP threshold, the first terminal performs resource reselection.

7. The terminal according to claim 6, wherein the physical-layer priority mapping rule further comprises: a mapping relationship between one or more of the following higher-layer parameters of the first terminal and the physical-layer priorities:
resource type;
data delay;
packet error rate;
maximum data burst volume; or
averaging window.

8. The terminal according to claim 6, wherein the priority of the service quality identifier is higher, the physical-layer priority is higher.

9. The terminal according to claim 6, wherein the physical-layer priority of the first terminal is updated according to a first update rule, and the first update rule comprises one or more of the following:
updating the physical-layer priority of the first terminal by the first terminal;
carrying the physical-layer priority of the first terminal in sidelink control information;
updating the physical-layer priority of the first terminal once each time a reserved resource of the first terminal is successfully preempted;
keeping the physical-layer priority of the first terminal unchanged for failed preemption of a reserved resource of the first terminal; and
updating the physical-layer priority of the first terminal per one or more of service, transport block, bandwidth part, carrier, and resource pool.

10. The terminal according to claim 9, wherein the updating the physical-layer priority of the first terminal per service or transport block comprises:
if a service or transport block arrives, initializing the physical-layer priority of the first terminal according to the physical-layer priority mapping rule; and
if transmission of a current service or transport block has been completed, resetting the physical-layer priority of the first terminal.

11. A computer-readable storage medium, wherein the computer-readable storage medium stores a computer program, and when the computer program is executed by a processor, the following steps are implemented:
receiving a physical-layer priority mapping rule from a network side device, wherein the physical-layer priority mapping rule comprises at least one of: a mapping relationship between one or more service quality identifiers of the first terminal and physical-layer priorities, and one or more priority values and physical-layer priorities; and
determining a physical-layer priority of the first terminal according to the physical-layer priority mapping rule; wherein
the physical-layer priority is used for determining a transmission resource for the first terminal;
if a measured RSRP value of a resource indicated by a received sidelink control information (SCI) is less than a SL-RSRP threshold, the first terminal does not perform resource reselection;
if the measured RSRP value of the resource indicated by the received SCI is greater than or equal to the SL-RSRP threshold, the first terminal performs resource reselection.

12. The computer-readable storage medium, according to claim 11, wherein the physical-layer priority mapping rule further comprises: a mapping relationship between one or more of the following higher-layer parameters of the first terminal and the physical-layer priorities:

resource type;
data delay;
packet error rate;
maximum data burst volume; or
averaging window.

13. The computer-readable storage medium, according to claim 11, wherein the priority of the service quality identifier is higher, the physical-layer priority is higher.

14. The computer-readable storage medium, according to claim 11, wherein the physical-layer priority of the first terminal is updated according to a first update rule, and the first update rule comprises one or more of the following:

updating the physical-layer priority of the first terminal by the first terminal;

carrying the physical-layer priority of the first terminal in sidelink control information;

updating the physical-layer priority of the first terminal once each time a reserved resource of the first terminal is successfully preempted;

keeping the physical-layer priority of the first terminal unchanged for failed preemption of a reserved resource of the first terminal; and updating the physical-layer priority of the first terminal per one or more of service, transport block, bandwidth part, carrier, and resource pool.

\* \* \* \* \*